(12) United States Patent
Topping

(10) Patent No.: US 8,955,251 B2
(45) Date of Patent: Feb. 17, 2015

(54) RAISED BORDER BRACKET ARRANGEMENT

(71) Applicant: VegHerb, LLC, Port Chester, NY (US)

(72) Inventor: Anthony Topping, White Plains, NY (US)

(73) Assignee: Vegherb, LLC, Port Chester, NY (US)

( * ) Notice: Subject to any disclaimer, the term of this patent is extended or adjusted under 35 U.S.C. 154(b) by 60 days.

(21) Appl. No.: 13/673,501

(22) Filed: Nov. 9, 2012

(65) Prior Publication Data

US 2014/0130411 A1    May 15, 2014

(51) Int. Cl.
*A01G 1/08*    (2006.01)

(52) U.S. Cl.
CPC ........................................ *A01G 1/08* (2013.01)
USPC ............................................................. 47/33

(58) Field of Classification Search
USPC .................................. 47/33; 52/102; 256/19
See application file for complete search history.

(56) References Cited

U.S. PATENT DOCUMENTS

| | | | | |
|---|---|---|---|---|
| 2,744,357 A * | 5/1956 | Foote | ................................. | 47/33 |
| 4,907,783 A * | 3/1990 | Fisk et al. | ....................... | 256/32 |
| 5,154,032 A * | 10/1992 | Ritter | ........................... | 52/592.1 |
| 5,205,090 A * | 4/1993 | Lavery | ............................ | 52/102 |
| 5,291,708 A * | 3/1994 | Johnson | ........................ | 52/282.2 |
| 5,439,201 A * | 8/1995 | Landreville | ................. | 256/65.06 |
| 5,806,249 A * | 9/1998 | Helms | .............................. | 52/102 |
| 5,901,526 A * | 5/1999 | Vidmar et al. | .............. | 52/745.09 |
| 6,202,367 B1 * | 3/2001 | Marino et al. | ................... | 52/102 |
| 8,528,249 B1 * | 9/2013 | Kao | .................................. | 47/33 |

* cited by examiner

*Primary Examiner* — Son T Nguyen
(74) *Attorney, Agent, or Firm* — Leason Ellis LLP

(57) ABSTRACT

A raised border system is disclosed. The system includes one or more brackets that secures at least one beam in position using at least one anchor stake to create a variety of edging systems. The brackets include nubs that can be inserted into the brackets without the use of tools and are sized and shaped to securely engage a beam in a manner such that the force required to assemble the beams is relatively small and is well exceeded by the force required to disengage the beam from the bracket. While the nubs obviate the need for traditional fasteners or tools, the border system is still compatible with traditional fasteners affording the user a wide variety of options during construction. The system is also universally compatible with a variety of beam materials and sizes.

8 Claims, 6 Drawing Sheets

RAISED BORDER BRACKET ARRANGEMENT

TECHNICAL FIELD OF THE INVENTION

This invention relates to the home gardening and landscape industry, and, in particular, a support device for constructing raised borders or beds suitable for use as landscape edging.

BACKGROUND OF THE INVENTION

Timber is used for building borders or walls on the ground to form edging for lawns and gardens. Generally, such edging systems comprise wooden beams and means for anchoring the wooden beams on the ground. However, current devices in the market do not provide a versatile raised border system which can be used to form a raised terrace bed or retaining wall of varying height without requiring extensive use of tools and physical effort to construct.

Frequently, consumers in the home gardening industry will use railroad ties to form landscape edges. However, the general problem with railroad ties is that they are costly, burdensome and once in place become difficult to remove. Further, due to the large weight and size of railroad ties, stacking them to create retaining walls may require excessive labor involving one or more parties and, as a result, be impractical. In addition, a separate means must be applied to anchor the railroad ties both to the ground and to one another.

Some edging devices do not provide the versatility often needed in landscaping due to the fact that they are limited to forming edging only at right angles or of limited shape and size. For example, a user may desire to encircle a large area or create a variety of shapes such as a semicircle, octagon, triangle, trapezoid or parallelogram. As a result, these traditional devices limit the user's creativity. In addition, some edging devices require extensive assembly that is time consuming, labor intensive and complicated. This assembly often includes a significant amount of hardware and tools.

Therefore, it would be beneficial to have a border system that does not require traditional hardware. In particular, it would be beneficial to have a border system that could be assembled quickly, easily and with minimal or no use of tools. Furthermore, it would be beneficial to have a robust system that can be assembled with relative ease. For example, a system in which the components are snapped into place with minimal effort but which require a significant amount of force to disassemble the pieces, thereby providing a sturdy and resilient border system, is desirable. Nonetheless, it would also be beneficial to have a border system that allows the user to secure beams to the bracket system using traditional hardware if necessary, for example, if the user misplaced the dedicated pieces required for non-hardware assembly. It would also be beneficial to provide a border system that can be assembled using a variety of beam lengths allowing the user to create a border system in a variety of shapes. It would also be beneficial to provide a border system that can be assembled using a variety of different beam materials providing the user the flexibility of using standard materials or special materials. These considerations are addressed by the present invention.

SUMMARY OF THE INVENTION

The present invention concerns in a broad aspect a raised border system suitable for use as landscape edging. The raised border system is of the type that includes a bracket that secures at least one beam in position using at least one anchor stake. The beam being of the type having one or more beam holes therethrough in proximity to the end of the beam. More particularly, the border system comprises at least one support bracket for receiving a beam and an anchor stake, the bracket having a beam receiving portion attached to a mounting column having a central channel. The beam receiving portion has a hollow spine with a top wall, a bottom wall, a first side wall, a second side wall and one or more structural ribs therein and a first flange and a second flange extending away from the spine portion and forming a receiving channel. The first and second flanges each define one or more orifices therethrough positioned to cooperate with the beam holes of the beam. The system also includes at least one nub having a cap portion and a snap lock portion wherein the snap lock portion is removably and securely insertable into an orifice such that the cap portion is disposed on the interior of the receiving channel. The cap portion is sized to securely and removably join the beam to the support bracket.

The raised border system can further include a sealing insert with a sealing flange and a tab wherein the tab is insertable into a slot defined by the top wall and one of the structural ribs. The sealing flange can be shaped to match the profile of the at least one hollow beam.

The raised border system can further include one or more raised lips surrounding each of the one or more orifices wherein the one or more raised lips are formed on the exterior surface of the first and second receiving flange.

These and other aspects, features, steps and advantages can be further appreciated from the accompanying drawing Figures and description of certain illustrative embodiments.

DETAILED DESCRIPTION OF THE DRAWINGS

Illustrative embodiments of the invention will be described more fully hereinafter with reference to the accompanying drawings, in which some, but not all embodiments of the invention are shown. Indeed, the invention may be embodied in many different forms and should not be construed as being limited to the embodiments set forth herein; rather, these embodiments are provided so that this disclosure will satisfy applicable legal requirements. Like numbers refer to like elements throughout.

By way of overview and introduction, described herein is a raised border system for creating a barrier for edging gardens or lawns. In one embodiment at least one bracket is secured to a stake driven into the ground. Used together, the support bracket and stake support and anchor an end of a beam to the ground. Any number of stakes brackets and beams can be used to create a border which can be used for edging gardens and lawns, play areas, ponds or for the formation of retaining walls. The brackets and beams are sized and shaped so that they can be stacked one upon the other so a raised border system of various height can be provided. In accordance with a salient aspect of the invention, the brackets also include nubs that can be inserted into the bracket without the use of tools and are sized and shaped to securely engage a beam in a manner such that the force required to assemble the beams is relatively small and is well exceeded by the force required to disengage the beam from the bracket. As a result, the nubs, brackets and beams form a system that is quickly and easily construed without the use of tools. While the nubs obviate the need for traditional fasteners (e.g. screws), or tools, the bracket system of this embodiment of the invention is still compatible with traditional fasteners affording the user a wide variety of options during construction.

Figure 1:
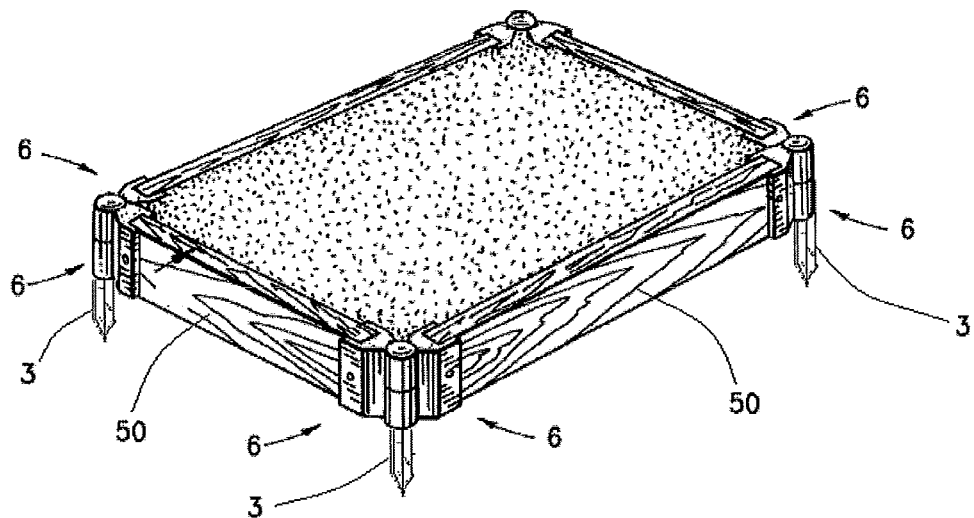
FIG. 1 is a perspective view of raised border system in accordance with principles of the disclosed embodiments.

FIG. 1 depicts a raised border system according to the present invention consisting of a plurality of brackets 6, stakes 3 and beams 50. The support bracket 6 is secured to the stake 3 in a manner such that the bracket can freely rotate 360° perpendicular to the vertical axis of the stake, while still effectively supporting a beam. Preferably, two brackets are mounted upon a single stake, thereby forming one unit of the raised border system. In this way, the two brackets can form a corner for supporting two beams upon an even plane with the ground and perpendicular to the vertical axis of the stake such that the brackets can form a variety of angles. By using multiple brackets, beams and stakes, the user can define an area with the border system.

Figure 2:
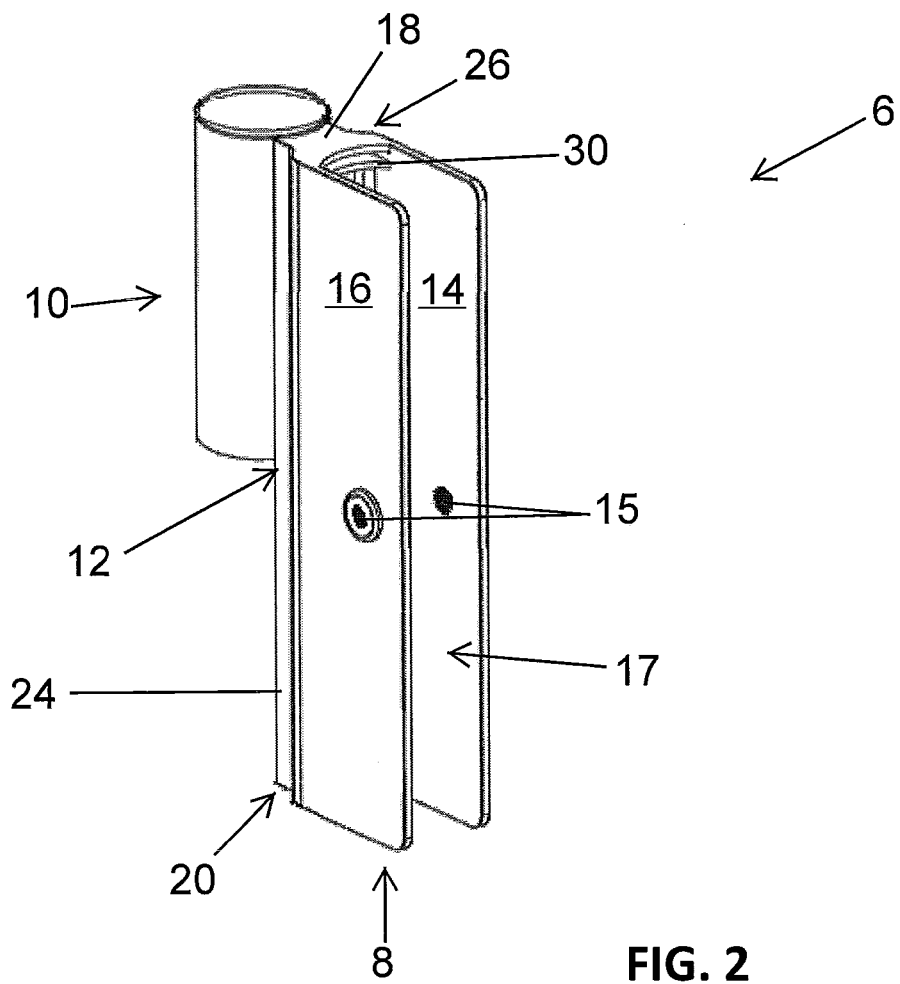
FIG. 2 is a perspective view of a raised border system in accordance with principles of the disclosed embodiments.

FIG. 2 depicts a bracket 6 according to an exemplary embodiment of the present invention. The bracket includes a beam receiving portion 8 and a mounting column 10. The mounting column 10 is cylindrical with a central channel 11. The mounting column is meant to receive a stake 3 (not pictured) and acts as a hinge for the beams that form the walls of the border system.

The mounting column is attached to the spine portion 12 of the bracket 6. The longitudinal axis of the channel of the mounting column is parallel to the longitudinal axis of the beam receiving portion 8. While the bracket can be formed of two or more parts that are complementary to one another, the bracket can also be formed as a single part. Preferably, the bracket is made of a light rigid plastic, such as acrylonitrile-butadiene-styrene copolymer, polyethylene, polyvinyl chloride, polycarbonate, polyproplene or styrene. It may, however, be made from any strong, sturdy and weather resistant material, such as wood, aluminum, fiberglass or galvanized metal.

The spine portion 12 has a top wall 18, a bottom wall 20, a front wall 22 (depicted in FIG. 8), a first side wall 24 and a second side wall 26 that define a generally hollow structure. The spine portion has one or more structural ribs 30 therein that are situated perpendicularly to the longitudinal axis of the spine portion.

The beam receiving portion 8 also includes a first flange 14 and a second flange 16 extending from the spine portion. First flange and second flange and spine portion generally define a receiving channel 17 for receiving the end of a beam (not pictured). Further, holes 15 are located in both the first flange and the second flange. As depicted, two concentric holes are provided, one through the first flange and the other through the second flange, however it should be understood that the flanges can include more holes.

Figure 3:
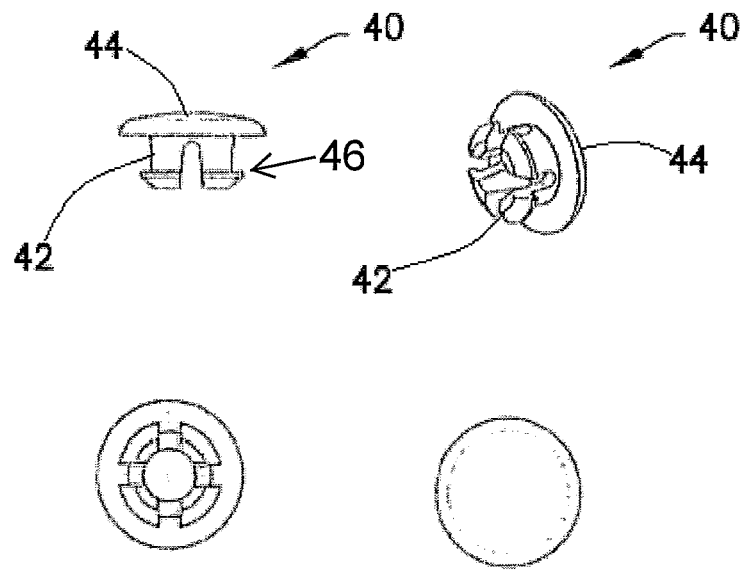
FIG. 3 is a perspective view of a raised border system in accordance with principles of the disclosed embodiments.

FIG. 3 depicts a nub 40 for use with the bracket to secure a beam according to an exemplary embodiment of the present invention. The nub includes a cap portion 44 and a snap-lock portion 42. The cap portion is circular in shape and has a rounded top surface to present a smooth interface to a beam when introduced into the channel 17, as described below. The snap-lock portion is sized and shaped such that the snap lock securely holds the nub in place when the snap-lock portion is fully inserted into the hole 15 from within the channel 17. Other configurations for the nub 40 can be implemented to achieve the snap-lock functionality, as will be appreciated by persons having ordinary skill in the art.

Figure 4:
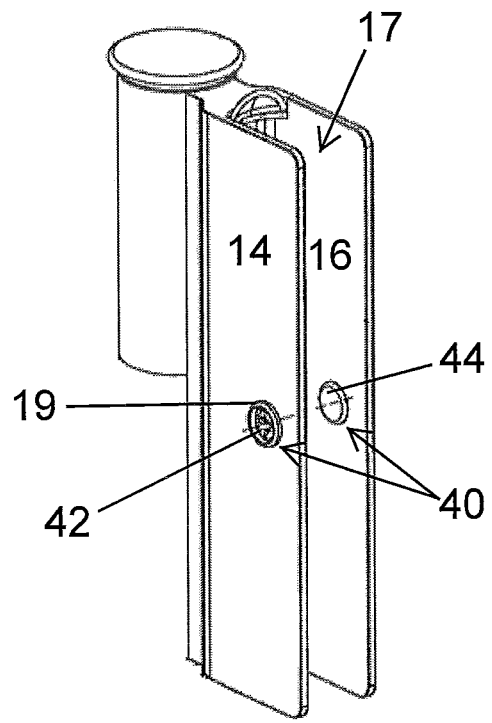
FIG. 4 is a perspective view of a raised border system in accordance with principles of the disclosed embodiments.

FIG. 4 depicts a beam receiving portion 8 with nubs 40 inserted into holes 15 in first flange 14 and second flange 16 according to an exemplary embodiment of the present invention. The beam receiving portion 8 also includes a raised ring 19 disposed on the exterior surface of the first flange and the second flange. The raised ring is a ring shaped feature that protrudes from the surface of the flanges and is concentric with the holes. The inner diameter of the raised ring is larger than the diameter of the hole to define a shelf that seats edge 46 of the snap-lock portion 42. Preferably, the inner diameter of the ring is not as large as the diameter of the cap portion 44 of the nub. Furthermore, it is also preferable that the height of the surface of the raised ring, as measured (normally) from the interior surface of the flange, is not as tall as the height of the snap-lock portion 42 of the nub. With this construction, the raised ring prevents the nub from being inserted into the hole, from the outside surface of the flange in a locking manner. Furthermore, the raised ring shields the snap-lock portion when it is inserted into the hole from the interior of the channel 17 and locked into place. Shielding the snap-lock portion in this manner prevents potential interference that may result in inadvertent disengagement of the nub.

Preferably, the channel 17 of the bracket has a width that is greater than the width of the beam (not pictured) that the bracket is to support. However, when the nubs are locked into place as described above, the distance between the cap portions 44 of the nubs is smaller than the width of the beam. Accordingly, when the beam is inserted into the channel 17, the beam exerts a force causing the flanges to deflect and spread further apart. The rounded cap portion of the nub allows the beam to slide across the nub with a relatively small amount of force. When the beam is maneuvered into position such that the beam holes are in register with the nubs, the elasticity of the first and second flanges causes them to rebound to their natural position and, correspondingly, the nubs matingly couple the beam and the beam receiving portion 8. The force required to assemble the beam and bracket can be substantially less than the disengagement force when the parts are sized and shaped this way.

Although the raised border system described herein includes nubs 40 to secure beams to brackets 17, the holes 15 also allow for the use of traditional fasteners such as screws, bolts, nails and the like. Traditional fasteners can be inserted through the holes 15 and into the beam, securing the beam to the bracket as would be well understood by a person of ordinary skill in the art.

Figure 5:
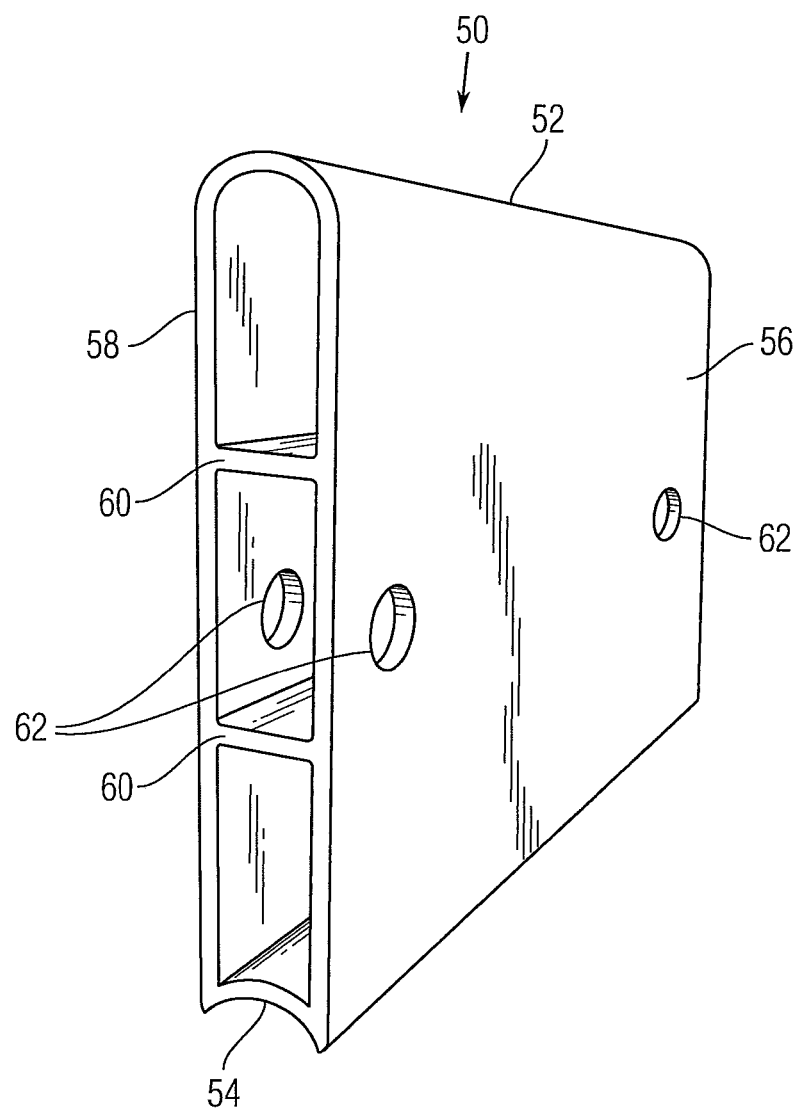
FIG. 5 is a perspective view of a raised border system in accordance with principles of the disclosed embodiments.

FIG. 5 depicts a beam 50 according to an exemplary embodiment of the present invention. The beam can be made from an engineered material, preferably, a light rigid plastic, such as acrylonitrile-butadiene-styrene copolymer, polyethylene, polyvinyl chloride, polycarbonate, polyproplene or styrene. However, the beam can also be made from a natural material such as wood or any other strong, sturdy and weather resistant material, such as aluminum, fiberglass or galvanized metal. The beam includes an upper wall 52, a lower wall 54, a first wall 56 and a second wall 58 that form a generally rectangular box. The interior of the beam is substantially hollow, and can include one or more beam ribs 60 that run the length of the beam and add structural rigidity to the beam The first wall and the second wall of the beam include one or more beam holes 62 therethrough. Preferably, the beam holes are concentric and have a diameter that is greater than or equal to the diameter of the cap portion 44 of the nub 40. The beam holes are located at the ends of the beam so as to align with the nubs when the end of the beam is inserted into the beam receiving portion of the bracket (not pictured).

Preferably, the height of the beam matches the height of the beam receiving portion thereby allowing multiple beams and brackets to be stacked one on top of the other to create a border structure of varying heights and without voids. In addition, preferably, the beam has a convex upper wall and a concave lower wall that are rounded in a complementary fashion such that when two beams are arranged one on top of the other they matingly engage.

Figure 6:
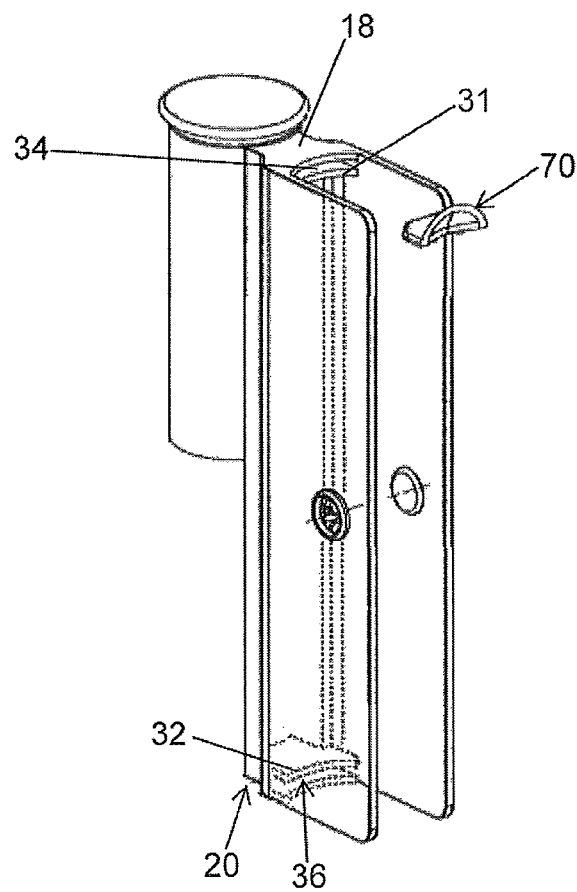
FIG. 6 is a perspective view of a raised border system in accordance with principles of the disclosed embodiments.

In reference to FIG. 6, the topmost rib 31 and the top wall 18 define a top slot 34, similarly, the bottommost rib 32 and the bottom wall 20 define a bottom slot 36. The top slot and the bottom slot are sized to each receive a sealing insert 70. When the end of the beam is inserted into the bracket the hollow interior of the beam and the hollow interior of the bracket are exposed due to the rounded upper wall and lower wall of the beam.

Figure 7:
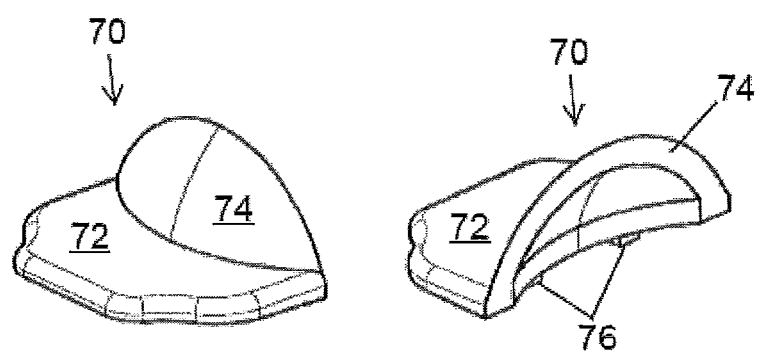
FIG. 7 is a perspective view of a raised border system in accordance with principles of the disclosed embodiments.

As depicted in FIG. 7, the sealing insert 70 is sized and shaped in order to keep undesirable material including dirt, debris, water, insects and the like out of the hollow beam or hollow bracket. The sealing insert can include a tab 72 and a sealing flange 74. The sealing flange has a rounded profile to correspond to the convex upper wall of the beam and the concave lower wall of the beam. The tab is shaped similarly to the shape of the top wall 18 of the spine portion 12. The insert can also include one or more feet 76 along the underside of the tab. Preferably, the feet and tab are narrower towards the distal end of the tab, allowing the tab to be easily inserted into the top slot 34 or bottom slot 36. The height of the feet can increase towards the proximal end of the tab to match the height of the top and/or bottom slot. Accordingly, the feet and tab create a friction fit with the rib and wall when the tab is inserted into the top or bottom slot.

In operation, a user of the border system takes a nub 40 and inserts snap lock portion 42 into hole 15 of the first flange 14 of the bracket 6 from within the channel 17. The user uses force to push snap lock portion into the hole until it is fully inserted such that it lockingly engages the flange. Preferably, the underside of the cap portion 44 sits flush against the first flange within the channel and the rounded top protrudes outward into the channel. The user can repeat this process with a second snap-lock portion by inserting it into the corresponding hole in the second flange in the same manner.

Once a user has lockingly engaged both nubs into the bracket, the user can also insert a sealing insert 70 into the bracket. This is done by orienting the sealing insert such that the rounded sealing flange points upwards along the longitudinal axis of the bracket and guiding the tab 72 into the top slot 34 of the bracket. The tab should be pushed into the top slot until it cannot be inserted any further and the sealing flange abuts the top wall 18. The user can repeat this process with a second sealing insert by inserting it into the corresponding bottom slot 36 in the same manner.

Preferably once the nubs and sealing inserts have been inserted into the bracket, the user can insert a beam 50 into the bracket by inserting it into the channel 17. When inserted, the beam exerts a force causing the flanges to deflect and spread further apart. The rounded top of the nub allows the beam to slide across the nub with a relatively small amount of force. The user aligns the beam such that the beam holes 62 are in register with the nubs. Once in registration, the elasticity of the first and second flange causes the flanges to restore/rebound to their natural position and causes the nubs to matingly couple the beam and the beam receiving portion 8. The user can engage the other end of the beam to another bracket in a similar manner.

While the border system can be supplied with beams of pre-defined lengths, the beams can be cut to size and beam holes can be drilled through the cut end in order to be able to engage a nub in the manner described above. Similarly, a user can create a beam using any suitable beam material (i.e. wood, plastic, metal) having a width that is preferably less than or equal to the width of the channel 17 as would be understood by a person of ordinary skill in the art. Ultimately, this flexibility allows the user to create a border of varying shapes and lengths and materials. Furthermore, while the exemplary border system incorporates nubs to matingly engage a beam and bracket, the system also allows a user to join a beam and a bracket with traditional fasteners as discussed above.

Figure 8:
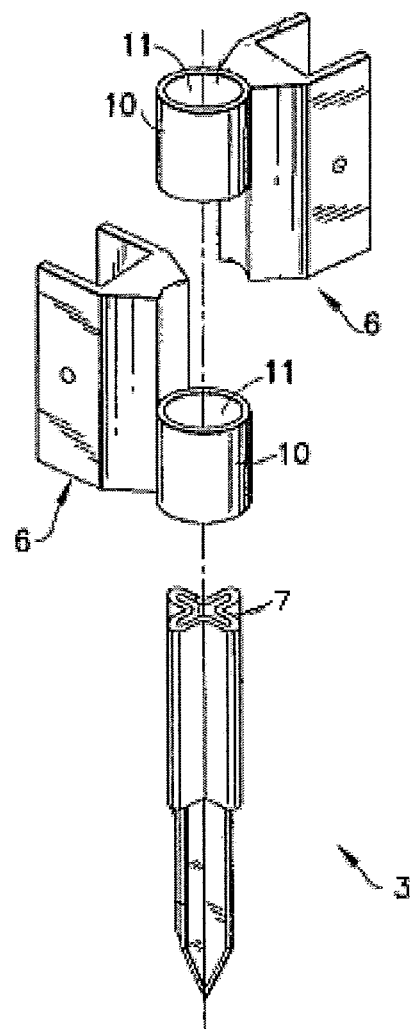
FIG. 8 is a perspective view of a raised border system in accordance with principles of the disclosed embodiments.

FIG. 8 depicts an exemplary raised border system according to an embodiment of the present invention. The bracket 6 and stake 3 are connected by inserting the top support member of the stake into the channel 11 of the mounting column 10, so as to form a male/female connector, such that the top support member 7 acts as the male component and the mounting column acts as the female component. Preferably, the support member is of such size so as to tightly engage the channel of the mounting column. It is desirable, but not mandatory, that there be as little space as possible, so as to form a tight junction between the stake and bracket. When connected, one bracket may rotate 360° perpendicular to the vertical axis of the stake. In the preferred embodiment, two identical brackets are used in conjunction with a single stake to form a single corner unit of the raised border system. The height of the top support member of the stake is twice the height of the mounting column of each bracket. In this way, one bracket can be placed on the top support member standing upward such that the mounting column encircles the lower half of the top support member. The other bracket can be rotated 180° upside down such that, when placed on the top support member, the mounting column encircles the top half of the top support member. In this way, both brackets are secured to a single stake while still being able to rotate perpendicular to the vertical axis of the stake. Further, the two mounting columns, one on top of the other, sit flush with the upper edge of the top support member. Where two identical brackets are placed upon a single stake, they may form an angle while remaining on an equal horizontal plane with one another. As a result, a variety of different edging shapes may be created depending upon the needs and/or desires of the user.

Figure 9:
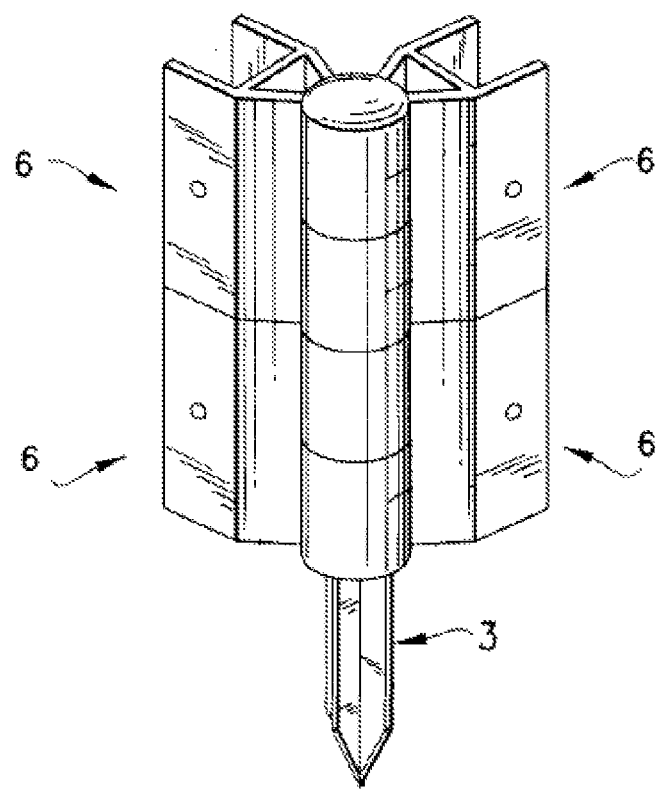
FIG. 9 is a perspective view of a raised border system in accordance with principles of the disclosed embodiments.

As depicted in FIG. 9, where it is desired to vertically engage multiple stakes or utilize a long single stake 3, more than one bracket 6 may be secured to the stake(s), one bracket on top of the other, so as to support and anchor multiple beams, one on top of the other, to form a border or retaining wall of desired height.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

What is claimed is:

1. A raised border system that secures at least one beam in position using at least one anchor stake, the beam being of the type having one or more beam holes therethrough in proximity to the end of the beam, comprising:
   at least one support bracket for receiving the beam and the anchor stake, the bracket having a beam receiving portion attached to a mounting column haying a central channel;
   wherein the beam receiving portion has a hollow spine with a first side wall, a second side wall and one or more structural ribs therein and a first flange and a second flange extending away from the spine portion and forming a receiving channel wherein the spline further has a top wall and a bottom wall and a slot that is defined by the top wall of the spline and one of the structural ribs, and the system further comprises a sealing insert with a sealing flange and a tab wherein the tab is insertable into the slot and wherein the sealing flange is shaped to match the profile of the at least one beam;
   wherein the first and second flanges each define one or more orifices therethrough positioned to cooperate with the beam holes of the beam;
   at least one nub having a cap portion and a snap lock portion wherein the snap lock portion is removably and securely inserted into one of said orifices such that the cap portion is disposed on an interior of the receiving channel and the snap lock portion faces outwardly away from the receiving channel, and wherein the cap portion is sized to securely and removably join the beam to the support bracket by being placed in registration with one of said beam holes.

2. The raised border system of claim 1, wherein an underside of the tab includes one or more feet such that the width of the tab and one or more feet corresponds to the width of the slot.

3. The raised border system of claim 1, wherein the first flange and second flange are flexible so as to resiliently deflect while the beam is inserted into the receiving channel.

4. The raised border system of claim 1, further comprising at least one hollow beam as the at least one beam having a first wall and a second wall each defining a beam hole therethrough in proximity to the end of the hollow beam, an upper wall and a lower wall.

5. The raised border system of claim 4, wherein the upper wall is convex and the lower wall is concave.

6. The raised border system of claim 5, wherein the curvature of the upper wall matches the curvature of the lower wall such that a plurality of the one or more hollow beams can be placed one on top of the other.

7. The raised border system of claim 1, further comprising one or more raised rings surrounding each of the one or more orifices wherein the one or more raised rings are formed on an exterior surface of the first and second receiving flange.

8. The raised border system of claim 7, wherein the each of the one or more raised rings is sized to preclude the snap lock portion of the nub from engaging the one or more orifices when introduced from the exterior surface of the first and second receiving flange.

* * * * *